Feb. 12, 1935.   A. S. JOHNSON   1,990,651
DRAWBAR GUIDE FOR AUTOMATIC TRAIN PIPE CONNECTERS
Filed May 9, 1932   6 Sheets-Sheet 1

Inventor,
Albert S. Johnson.

Attorney.

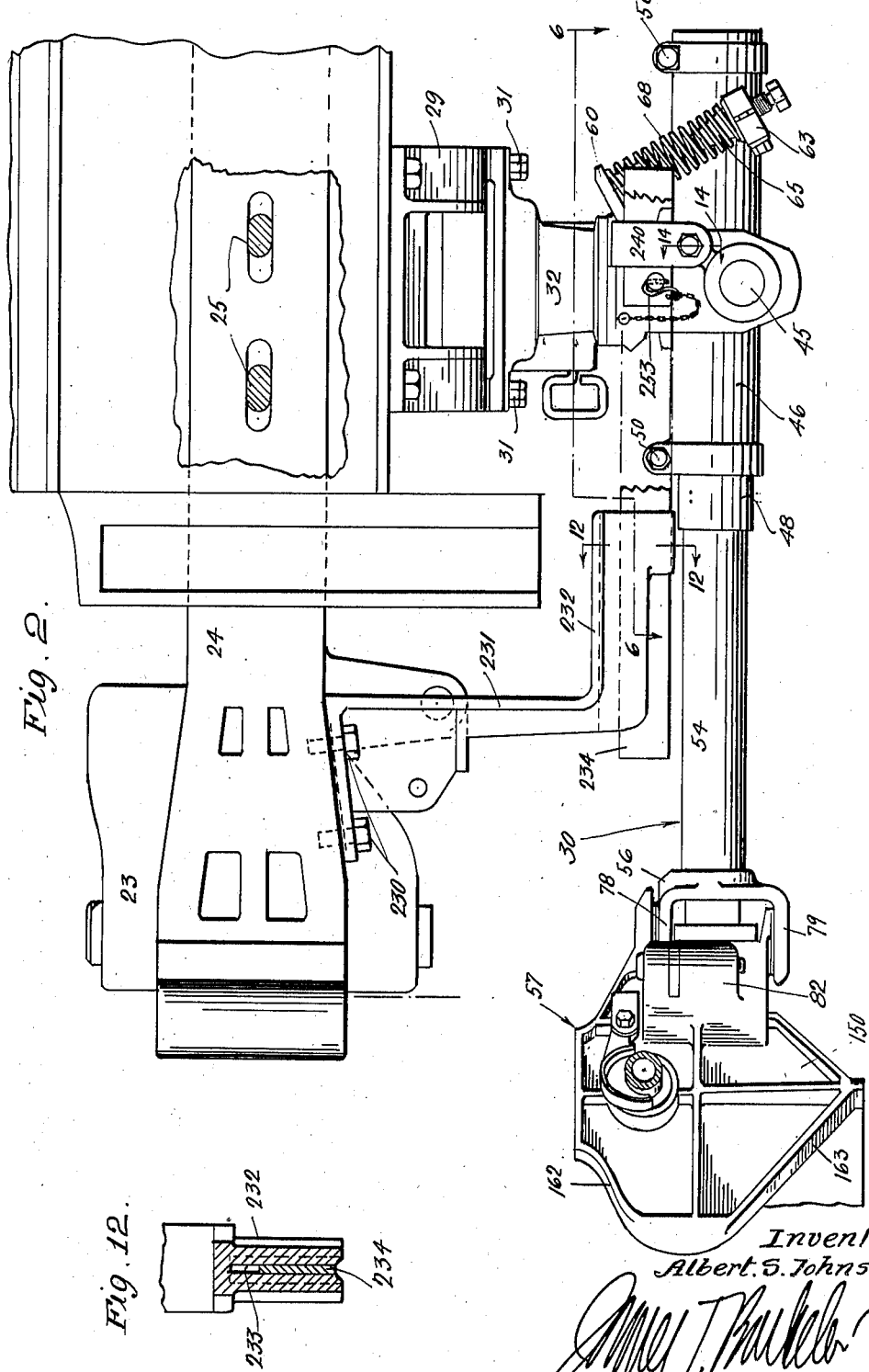

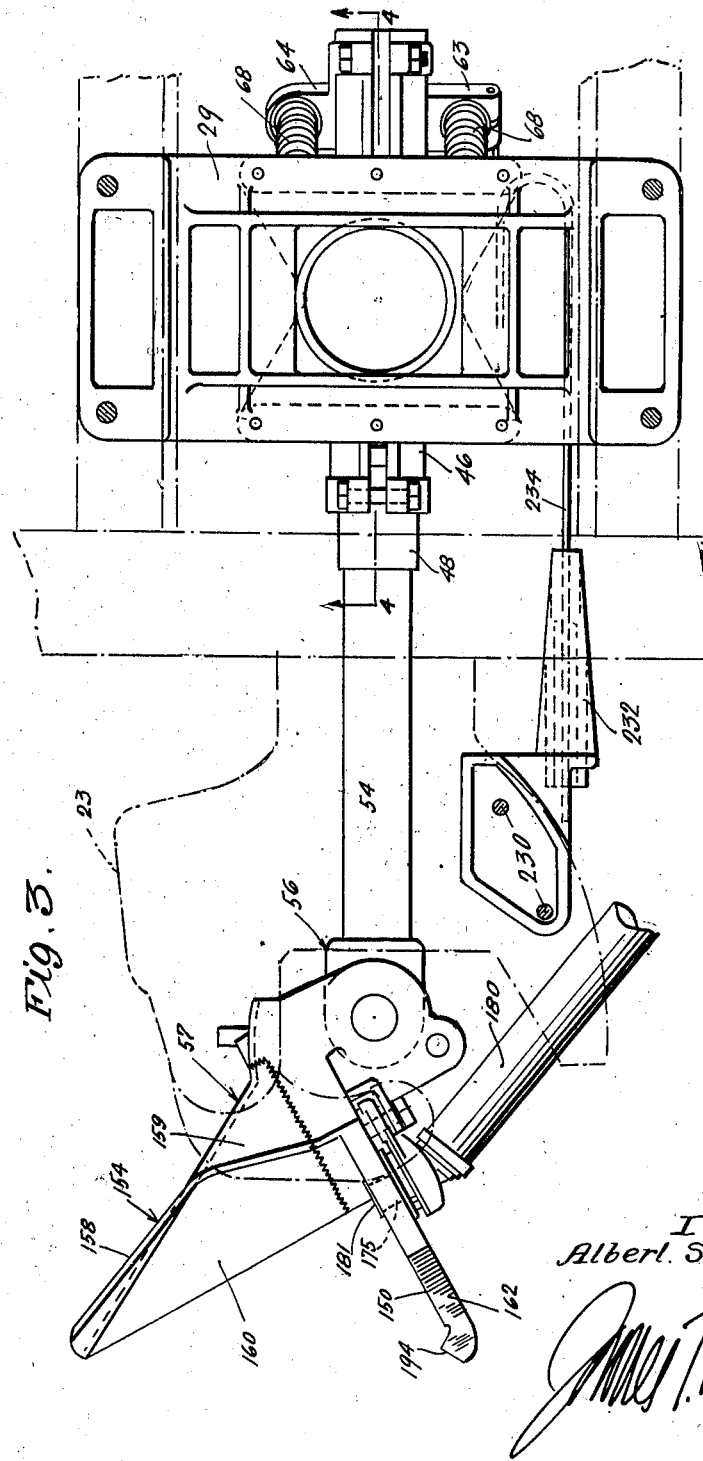

Feb. 12, 1935.  A. S. JOHNSON  1,990,651
DRAWBAR GUIDE FOR AUTOMATIC TRAIN PIPE CONNECTERS
Filed May 9, 1932  6 Sheets-Sheet 4
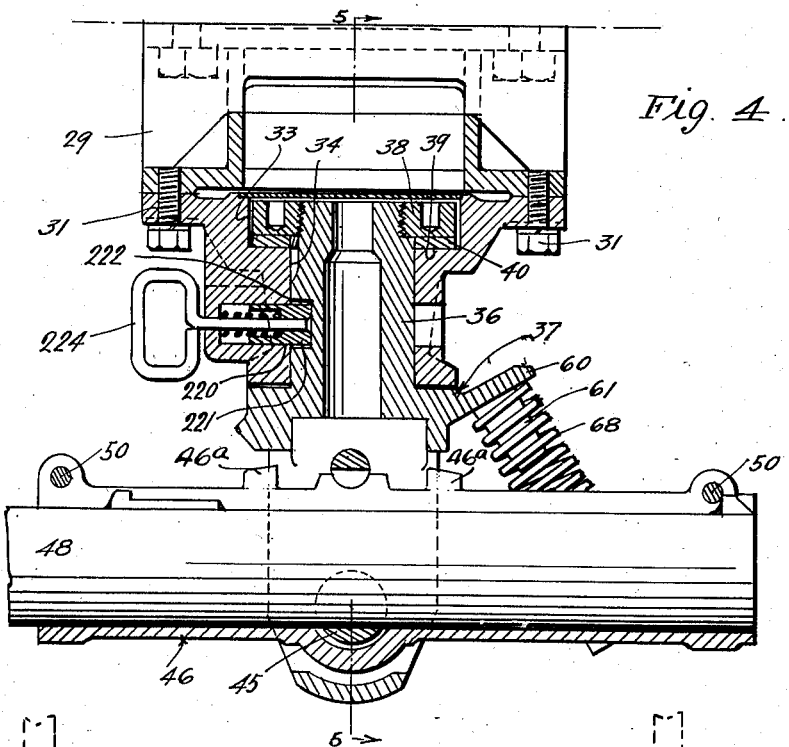
Fig. 4.
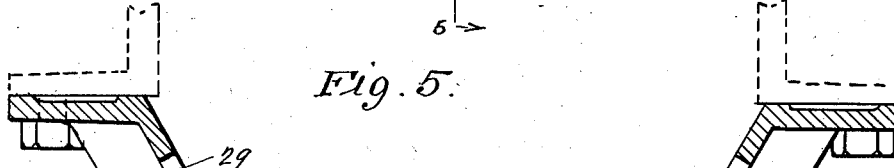
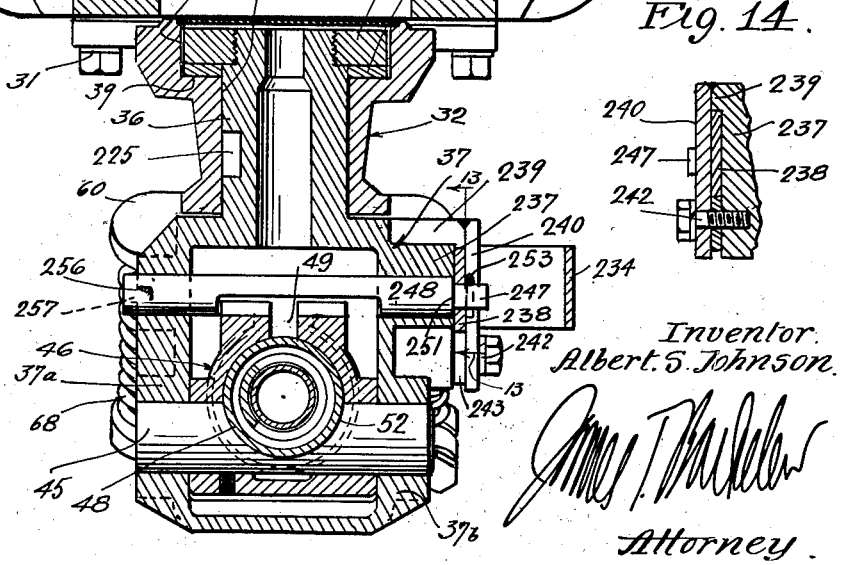
Fig. 5.
Fig. 14.
Inventor.
Albert S. Johnson.
Attorney.

Feb. 12, 1935.  A. S. JOHNSON  1,990,651
DRAWBAR GUIDE FOR AUTOMATIC TRAIN PIPE CONNECTERS
Filed May 9, 1932  6 Sheets-Sheet 5
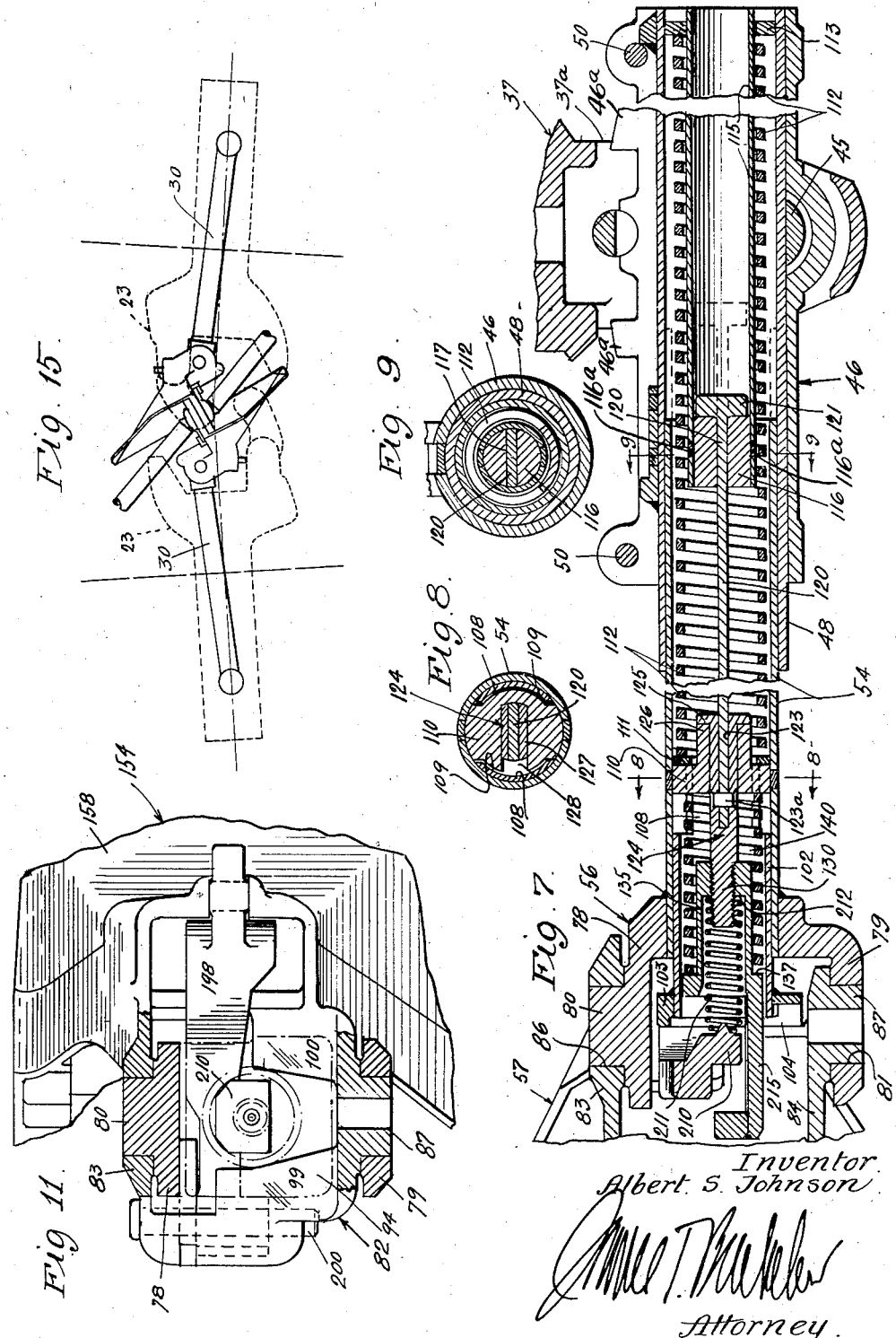
Inventor
Albert S. Johnson
Attorney.

Feb. 12, 1935. A. S. JOHNSON 1,990,651
DRAWBAR GUIDE FOR AUTOMATIC TRAIN PIPE CONNECTERS
Filed May 9, 1932 6 Sheets-Sheet 6
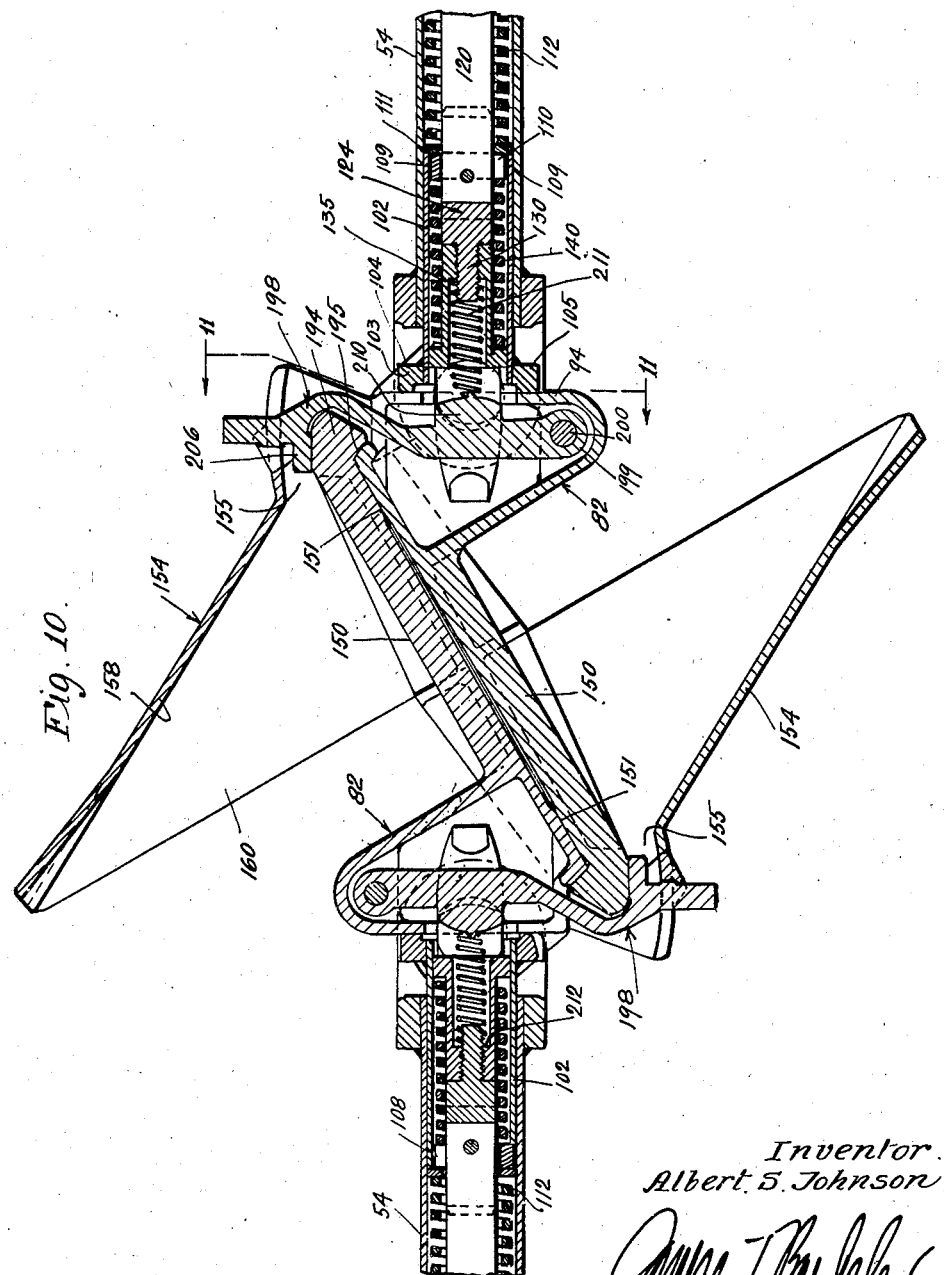
Inventor.
Albert S. Johnson.
Attorney.

Patented Feb. 12, 1935

1,990,651

UNITED STATES PATENT OFFICE 1,990,651

DRAWBAR GUIDE FOR AUTOMATIC TRAIN PIPE CONNECTERS

Albert S. Johnson, Los Angeles, Calif., assignor to Johnson Connector Company, Ltd., Los Angeles, Calif., a corporation of California Application May 9, 1932, Serial No. 610,279

21 Claims. (Cl. 213—76)

This invention relates generally to automatic car couplers, and more particularly to automatic couplers for train pipes.

The equipment of railway cars with means for automatically connecting their air and steam pipes as their draw bars are coupled presents a large number of difficult problems. There is first the problem of providing the automatic pipe connecters with guiding and gathering devices that will assure gathering of the pipes into alinement from the extreme positions of misalinement frequently encountered in practice. For instance, due to conditions of not unusual track unevenness, one coupler may be depressed several inches, and perhaps also rotated through a certain angle, relative to the other, and again, on curved tracks, the connecters while extending at right angles from their respective car ends, extend towards each other at an angle, all rendering certainty of gathering difficult to accomplish. On curved tracks the draw bar couplers themselves frequently fail to couple because of such angularity, and to assure making of the draft coupling in such cases, the draw bars (which are mounted on the car body to swing horizontally) are frequently thrown over by hand into as close alinement as possible before the cars are moved together.

One well known prior art manner of mounting the automatic train pipe connecters consists in suspending them directly from the draw bars. No great difficulty is encountered in that case in bringing the connecters into proper engagement if the draw bars gather properly, since they are alined by the gathering and connection of the draw bar couplers. There are, however, many unavoidable disadvantages in a draw bar suspended pipe connecter, among which may be mentioned the continual relative motion and severe jarring that always occurs between interengaged draft couplings, the shock of which is fully received by the pipe connecters when rigidly suspended from the draw bars. The resulting strain and wear on the pipe connecters materially increases the liability of leakage from the lines, and makes necessary frequent inspection, repair and replacement.

The other type of mounting common in the prior art consists in mounting the automatic pipe connecters on the fixed car structures proper, entirely independent of the draft couplings. This mounting has the considerable advantage of freedom from the violent action of the draft coupling members, but the connecters are much more difficult to gather together when the misalinement is extreme.

It may now be stated as a primary object of the present invention to provide a train pipe connecter mounting that is entirely free of the jarring action of the draft coupling, that at the same time ensures proper gathering and connection of the pipe connecters in all cases in which the draft couplers will couple.

In accordance with the preferred form of the present invention, the pipe connecter is articulated directly to the fixed car body structure through a mounting enabling it to swing in a horizontal plane, and is guided to swing horizontally with the draw bar. For this purpose there is suspended from the draw bar a guide arm, which has preferably a yielding or resilient interconnection with the pipe connecter arm. If the draw bar then is swung to one side or the other to facilitate coupling, the pipe connecter is caused by the guide arm to swing over also. Thus there is afforded assurance that if the draw bar couplers are in such relative positions that they can gather and lock, then the pipe connecters (which are provided with at least as great a gathering range as the draft couplers) will be in such relative positions that they will gather properly and couple also. If the misalinement is so great that the draw bar couplers do not couple, then, aside from possible damage to the pipe connecters, it does not matter if the pipe connecters also miss, although the pipe connecters are brought to such alinement by the provisions of the present invention that in many cases they couple properly even when the draft couplings miss.

It may be stated as a further object of the invention to provide a device mechanically suited to the rigorous requirements of train service, with regard to dependability, ruggedness, and freedom from necessity of frequent repair.

The invention will now be more fully understood from the following detailed description of a present preferred embodiment, reference for this purpose being had to the accompanying drawings, in which:

Fig. 2 is a side elevation of a car end showing the draw bar and pipe connecter, and the means for guiding the pipe connecter from the draw bar;

Fig. 3 is a plan view of the pipe connecter and draw bar guide arm, the overlying draw bar coupling being indicated in dot-dash lines;

Fig. 4 is a longitudinal vertical section of the vertical pivot mounting of the pipe connecter on the car body, this view being taken on line 4—4 of Fig. 3;

Fig. 5 is a transverse vertical section taken on line 5—5 of Fig. 4;

Fig. 7 is a vertical longitudinal section of the connecter arm and mounting, showing also a mounting of the connecter head on the arm; this view showing the arm in normal coupled position;

Fig. 8 is a cross section of the connecter arm taken on line 8—8 of Fig. 7;

Fig. 9 is a cross section of the connecter arm taken on line 9—9 of Fig. 7;

Fig. 10 is a horizontal medial section through a pair of coupler connecter heads, being a view taken as indicated by line 10—10 of Fig. 1;

Fig. 11 is a vertical section taken on line 11—11 of Fig. 10;

Fig. 12 is a detail section of the draw bar guide arm and spring as taken on line 12—12 of Fig. 2;

Fig. 14 is a detail section taken on line 14—14 of Fig. 2; and

Fig. 15 is a diagram illustrating the tendency for the connecter arms to swing outwardly during coupling.

Figure 1:
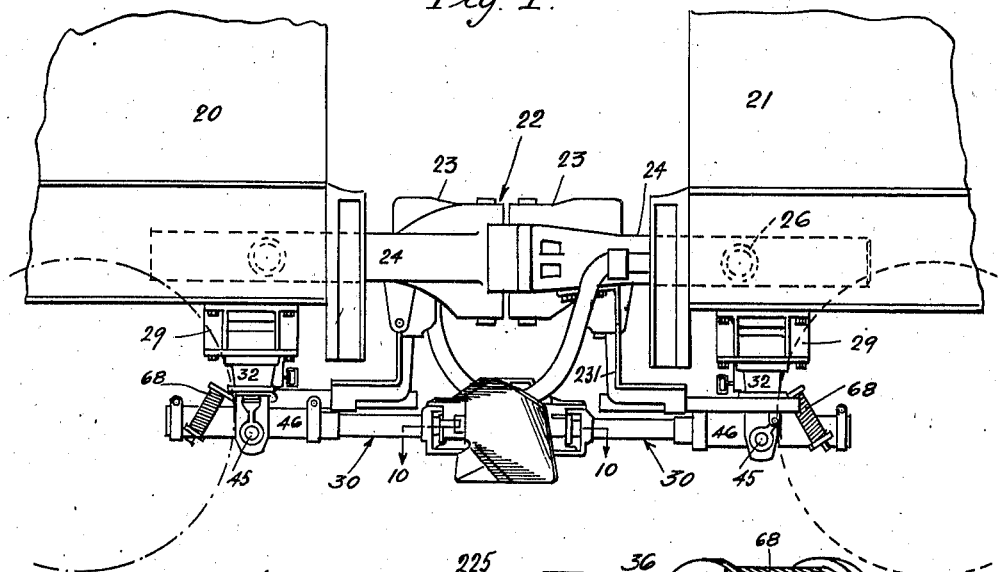
Fig. 1 is a side elevation of the meeting ends of a pair of coupled cars equipped with the devices of the present invention.

In Fig. 1 of the drawings, numerals 20 and 21 designate a pair of cars coupled by a usual draft coupling 22, the interlocking heads 23 of which are mounted on draw bars 24. The draw bars may be mounted to swing horizontally in any usual manner, either pivoting on vertical pins, or floating laterally on suitable guides, in which latter case the draw bar may be considered as having a loosely pivoted arrangement. In Fig. 2 the draw bar is indicated as floating horizontally on guide members 25. On passenger equipment, centering springs are used on draw bars, as indicated at 26 in Fig. 1. On freight equipment such centering springs ordinarily are not used, and Fig. 2, which does not show springs, typifies a freight installation. The draw bar coupler heads are of course provided with considerable gathering range so as to enable them to couple from positions of relative lateral, vertical, and rotative displacement. In case the lateral displacement of the two heads is too great to be cared for by the gathering range of the couplers, for instance on a track of considerable curvature, the draw bars are frequently thrown over horizontally by hand into positions of better alinement. This lateral movement of the draw bars to facilitate making of the draft coupling is utilized also to facilitate coupling of the pipe connecter heads, as will appear hereinafter.

Rigidly affixed to the under structure of the car body is a suspension bracket 29 for the train pipe connecter, generally designated at 30. To the underside of bracket 29 there is secured by screws 31 a hanger 32 that provides a vertical pivot bearing for the connecter arm mounting. This bearing is formed by a bore 33 extending downwardly in member 32 from the upper end thereof, and a reduced counterbore 34 extending upwardly from the flat lower end of member 32. Mounted for rotation in bore 34 is the stem 36 of a yoke member 37. The upper end of stem 36 has screw threaded thereon a bearing ring 38, which overhangs the shoulder 39 between bores 33 and 34 and bears down on a washer 40 resting on said shoulder to support the yoke and parts mounted thereon.

The yoke is thus mounted in bearing hanger 32 for pivoting movement about a vertical axis, such movement being limited, however, by certain stops as will be described hereinafter. The two arms 37a and 37b of the yoke carry between them a horizontal pivot pin 45 (see Fig. 5), the pin being mounted for rotation in the yoke arms. Mounted fast on pin 45 and extending between the two yoke arms is a cradle member 46 for the connecter arm. This cradle member 46 is tubular in form and extends horizontally in either direction from pin 45, as clearly shown in Fig. 4. The tubular cradle fits about a longitudinally extending connecter arm tube or cylinder 48, the cradle being longitudinally split at the top, as at 49, and being provided with clamping screws 50 adapted to be set up to clamp tube 48 tightly in place. As shown in Fig. 5, the pivot pin 45 is cut out at 52 to fit snugly about tube 48.

Telescopically slidable within the tube or cylinder member 48 is a plunger member in the form of a tube 54. This plunger tube has fitted and welded on its forward end a yoke or knuckle 56 providing a vertical pivot mounting for the connecter head 57.

It will be noted that the cradle 46, the telescoping tubes 48 and 54, and the knuckle 56 and connecter head 57 carried thereby are mounted on horizontal pin 45 to swing in a vertical plane by pivoting between the arms of the vertically pivoted yoke member 37. This vertical swing, however, is limited to approximately ten degrees by the engagement of cradle lugs 46a with the yoke. Means now to be described are provided for yieldingly supporting the arm in a normal position of horizontal extension and resiliently resisting such vertical swinging movement. As well shown in Figs. 2, 4, and 6, the pivot yoke member is provided at the base of its pivot stem 36 with a rearwardly extending and upwardly inclined bracket 60 providing coil spring seats or projections 61, and cradle sleeve 46 is provided with oppositely extending bracket arms 63 and 64 which carry spring seats 65 opposite seats 61. Mounted on the seats are compression springs 68. These springs are of course adjusted to support the connecter arm yieldingly in a position of horizontal extension, and it will be noted that the springs support the arm in all positions of horizontal rotation on its vertical pivot mounting.

The knuckle or yoke 56 mounted on the forward end of tube 54 is formed with a pair of upper and lower arms 78 and 79, respectively, the upper arm having a round upwardly extending boss 80, the lower arm having a vertical bore 81 axially alined with the boss 80. The coupler head casting 57 is formed at its rear with a housing structure 82 for a locking device hereinafter to be described. The upper wall of said structure is extended rearwardly to form a bracket 83, and said bracket is provided with a bore 86 adapted to rotatively take the knuckle boss 80, and the lower wall of the structure is extended rearwardly to form a bracket 84, which is provided with a round downwardly extending boss 87 adapted to be rotatively taken in knuckle bore 81. Thus the connecter head is vertically pivoted on the forward end of the connection arm.

The rear vertical wall 94 of the head is at right angles to the connecter arm axis, and is cut away at the top and in the center to provide for the locking device, leaving only a pair of rear wall portions or lugs 99 and 100, which present flat faces toward and at right angles to the connecter arm (see Figs. 10 and 11).

The forward end of arm tube 54 has slidably mounted therein a buffer tube 102 having on its forward end a buffer head 103 adapted to engage the rear wall lugs 99 and 100 of the connecter head. The buffer head is preferably in the form of a square plate having a bore therethrough to take the forward end of tube 102, and is fastened to tube 102 as by welding. The two vertical sides 104 and 105 of the plate engage the two head lugs 99 and 100, respectively, on opposite sides of the longitudinal connecter arm axis (see Fig. 10). The rear end of tube 102 is formed with a pair of rearward projections 108 which pass through slots 109 provided in a head 110 welded within tube 54, as will be seen from Figs. 7, 8, and 10. These projections 108 come against a washer 111 to the rear of head 110 which washer in turn comes against one end of a compression spring 112, the other end of which spring bears against an abutment 113 welded within the rear end of tube 48. It will be understood how any pivotal movement of the connecter head about the vertical pivot axis on the knuckle 56 is yieldingly resisted by spring 112, and it will be understood that spring 112 constantly acts through the buffer member to return the connecter head to centered position when displaced therefrom. In the present embodiment the vertical pivot mounting of the connecter head permits the head to swing, against the resistance of the buffer member, to a maximum angle of 27½ degrees on either side of the centered position illustrated in the drawings.

Spring 112, bearing at one end against abutment 113 in the rear end of tube 48, and at the other end against abutment 110 in tube 54, also acts at all times to extend tube 54 from tube 48. Such extensive telescopic movement of the tubes, however, is opposed and limited as now to be described. The abutment 113 in the rear end of tube 48 carries a tube 115 that projects through spring 112, the forward end of this tube having welded therein a head 116, the weld being indicated at 116a. This head 116, is cut through with a rectangular guide slot 117 (see Fig. 9) for a flat, tension rod 120. The rear end of tension rod 120 is formed with an enlarged head 121 adapted to engage abutment 116 of tube 115. The forward end of rod 120 is taken within a slot 123 cut in a bolt member 124 and is fastened therein by means of a pin 123a. The shank 127 of this bolt member is rectangular in cross section, and slides through a correspondingly shaped guide slot 128 in head 110 (see Fig. 8), while the rear end of the bolt has an enlarged head 125 adapted to engage a boss 126 extending rearwardly from head 110 within spring 112, as shown in Fig. 7.

The forward end 130 of bolt 124 is cylindrical and screw-threaded, and screw-threaded thereon is the head of a tubular member 135 that projects forwardly through buffer tube 102. Member 135 has a flange that provides a rearwardly facing shoulder 137, and confined between said shoulder and the plunger tube abutment 110 is a compression spring 140.

The full line position of Fig. 7 shows the normal uncoupled position of the connecter arm. It will be apparent from that figure that spring 112 is acting against head 110 to extend the plunger tube 54 from the cylinder tube 48, and that such extension is resisted by the tension rod 120, the head 121 of which engages the fixed abutment 116, and the other end of which is connected within the forward or plunger tube. The action of these parts during coupling and uncoupling will be explained in more detail at a later point in the specification.

Considering now the connecter head proper, each head has extending forwardly from the previously described housing structure 82 a vertical plate or tongue part 150 which crosses the longitudinal connecter arm axis at an angle of about thirty degrees. The head also has a part 154 forming a flaring guide mouth terminating rearwardly in a contracted throat 155, the guide mouth of each head being adapted to receive the tongue of the other head, so that the surfaces 151 of the two tongues come into contact. The guide mouth formed by part 154 is defined by rearwardly converging side, upper and lower walls 158, 159, and 160, respectively, all tapering toward the open contracted throat 155. The forward portion of each tongue member 150 is formed with converging upper and lower edges 162 and 163, respectively, adapted to ride and be guided down or up the inclined walls 159 and 160 of the guide mouth of the opposing head into proper elevation for connection, while the side wall 158 of the mouth gathers the tongue laterally into position.

Thus the tongue of each head moves into the guide mouth of the other head as the cars are moved together, the flaring of the guide mouth being sufficient to gather the head properly within comparatively wide limits of misalinement.

Opening to the contact surface 151 of each tongue 150 is an air port 175 that extends through the tongue, and connected to said port at the rear side of the tongue is an air hose 180. This air port 175 is provided at the contact surface of the tongue with a suitable gasket, as indicated at 181.

The tip of each tongue 150 is formed with a projecting lug 194 which engages the face of the opposing tongue as the heads come together. The engagement of these lugs 194 with the opposing tongues causes the two heads to pivot through a certain angle on their vertical pivot mountings on the supporting knuckles 56. As the heads continue to move together, the heads pivoting as desirbed, the tongue lugs hold the tongues separated until the air port gaskets are nearly alined, and then finally ride down seating surfaces 195 to permit the opposed tongues to come face to face, the heads pivoting back to center position by action of the buffers, and the parts finally taking the position of Fig. 10.

To hold the tongues against separative movement until the heads are to be disconnected, there is provided a latching device 198 which automatically engages the end of the tongue as the heads reach the interengaged position of Fig. 10. In the present preferred form, this latching device takes the form of a latch member 198 contained within the previously described housing structure of the head. The latch member has a hub 199 mounted to pivot on a vertical pin 200 mounted in the head (see Fig. 10). From hub 199 the latch extends horizontally across the longitudinal coupler axis to a hook-end 206, which is adapted to hook over the forward end of the tongue of the opposing head. Latch 198 has intermediate its ends a lug 210 which is alined with the longitudinal axis of the coupler arm, and said lug is adapted to provide a seat for one end of a compression spring 211, the other end of which extends within the bore of tubular member 135 and engages an annular shoulder 212 at the head thereof. This spring serves the purpose of constantly urging the latch toward latching position.

As previously stated, Fig. 7 in full lines shows the position of the connecter arm parts in uncoupled position. Fig. 2 also shows the same position, and also shows that in uncoupled position the connecter head extends outwardly somewhat beyond the end of the draw bar coupler head. As the cars move together, the interengagement of the pipe connecter heads causes the plunger tubes 54 of the connecter arms to recede within the cylinder tubes 48 against the force of springs 112 until the draft couplers engage, this action bringing the tubes to the dotted line position of Fig. 7. During this operation, the connecter heads will have rocked on their vertical pivotal mountings on the knuckles 56 against the spring pressed buffer plates as the two tongues interengaged and finally came into face to face contact, and the latches will have become hooked over the tongue ends to lock the heads securely together, the parts then being in the position illustrated in dotted line in Fig. 7 and in full lines in Fig. 10. When the cars are coupled the telescoping coupler arm tubes thus ride in the retracted dotted line position of Fig. 7, the compression springs 112, which act to extend the plunger tubes, being at such time under some compression. Small relative movements of the coupled cars as slack comes into or is taken out of the draft connection is then taken up by relative movement of tubes 54 in tubes 48, cushioned by springs 112.

To uncouple the cars, the draft coupler heads 23 are released and the cars moved apart. Since the pipe connecter heads are still locked together, this causes the plunger tubes 54 of the connecter arms to be extended from the cylinder tubes 48, as will be evident. For release of the latch, the tubular member 135 attached through bolt member 127 to tension rod 120, is provided with a forwardly reaching hook member 215 which is adapted to engage the forward side of latch lug 210 and move the latch rearwardly to release the tongue during such extension of the connecter arm. It will be evident that as the arm extends, the head 121 of tension rod 120 engages abutment 116, which arrests the forward movement of the tension rod and tubular member 135 with its hook part 215, so that the relative forward movement of the head and plunger tube brings the latch lug 210 against hook 215 and so causes relative rearward movement of the latch and consequent release of the connecter heads.

The extension of the plunger tube from the cylinder tube of each connecter is yieldingly resisted by the spring 140, and when the connecter heads have disengaged, this spring 140 immediately acts to cause retraction of the tube to the uncoupled position shown in full lines in Fig. 7.

Figure 6:
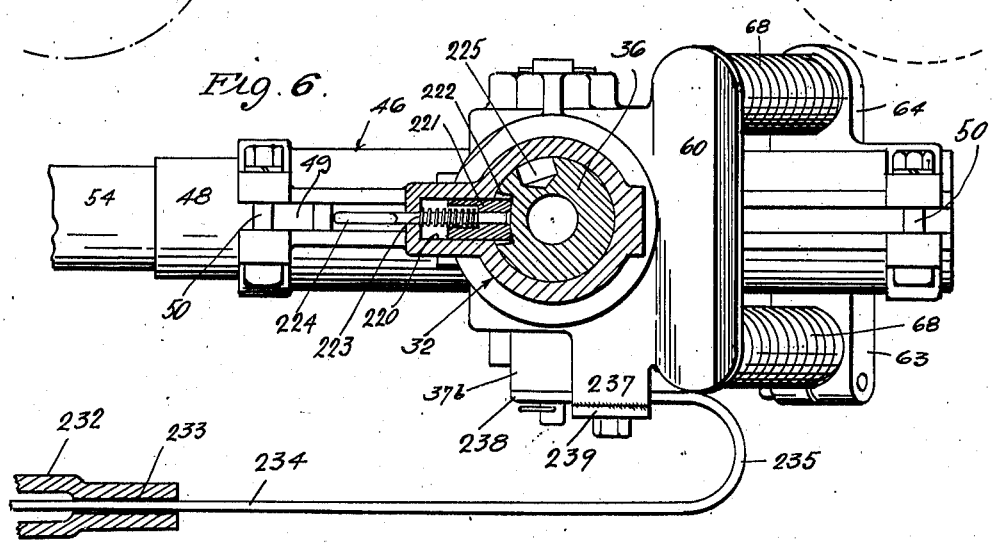
Fig. 6 is a view taken as indicated by broken line 6—6 of Fig. 2.

Figs. 4 and 6 show the provisions for limiting the horizontal swing of the connecter arm. As there shown the side wall of the pivot bearing member 32 is formed with a bore 220 within which works a locking plunger 221 which is adapted to be received within a notch 222 cut in the stem of the pivot yoke member 37. Notch 222 is of sufficient horizontal length to permit the pivot yoke stem to swing through the angle necessary for proper operation of the connecter arm, which may be for instance about ten degrees.

This limitation on the horizontal swing of the connecter arm is not too great to prevent the arm from swinging sufficiently for the purpose of coupling, but prevents the arm from swinging out undesirably far during the coupling. It will be evident, for example, when the cars are on a curved track and the two connecter arms are at an angle to one another that as the pipe connecter heads engage (see Fig. 15) the tendency is for the arms to swing outwardly, and this may be true whether the heads gather properly and connect, or, in extreme cases, engage one another without connecting. Such outward swinging of the arms if unrestricted would cause the telescoping tubes to bind so that the arms could not retract, and would also cause damage to the draw bar guide provisions described hereinafter, whereas by limiting the horizontal swing of the arms these undesired results are prevented.

Back of plunger 221 is a spring 223 which constantly urges the plunger into locking engagement with the pivot stem, and connected to the plunger and extending out through the side wall of bearing member 32 is a handle member 224, by means of which the plunger may be retracted to permit the connecter arm to be swung beyond the limits permitted by notch 222. For instance, when it is desired to carry the connecter arm in inoperative position, this handle 224 is pulled and the connecter arm rotated to a position at right angles, another notch 225 being provided in the pivot stem to permit the arm to be locked in that position.

It has been described how the pipe connecter arm is mounted to swing horizontally through a limited angle on a vertical pivot mounting on the car body, and it has also been described how the draw bar is mounted on the car for horizontal swinging movement, and how the draw bar is frequently thrown over to one side or the other to facilitate coupling. In accordance with the present invention, means are provided for guiding or positioning the pipe connecter arm to swing horizontally along with horizontal swinging of the draw bar, so as to assure that if the draw bars are in such relative horizontal positions as to be capable of coupling, then the pipe connecter arms will also be in relative positions from which the coupling positively will be made.

Figure 13:
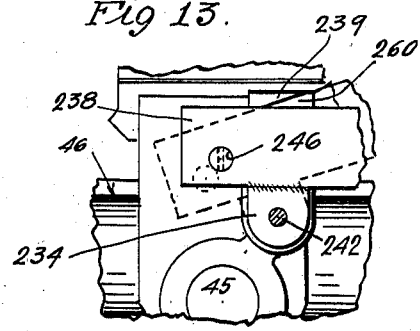
Fig. 13 is a detail section taken on line 13—13 of Fig. 5.

The present preferred means for accomplishing this end is embodied as follows: Secured by screws 230 to the under side of the draft coupler head, or to the draw bar at a point thereon that swings horizontally to an extent sufficient for the purpose, is a depending guide arm 231, which in the present form drops somewhat to one side of the connecter arm (see Fig. 3), and then turns rearwardly as indicated at 232. This rearward horizontal arm portion 232 is bifurcated to form a longitudinally extending slot 233, open at the bottom (see Figs. 6 and 12), that somewhat loosely takes an arm 234 that extends parallel to the connecter arm, and that is arranged to afford a resilient connection with the connecter arm so as to move it horizontally with horizontal movements of the draw bar. This arm 234, which is here shown in the form of a flat spring, disposed with its flat sides vertical, extends rearwardly to a point to the rear of the vertically pivoted yoke 37 on which the connecter arm is mounted and then recurves forwardly at 235 for connection to the leg 37b of said yoke. The yoke has a boss 237 providing a flat vertical surface against which the recurvate end 238 of the spring arm bears, and a part 239 that projects over the arm and carries a depending clamping plate 240 in engagement with the outer surface of spring end 238. The lower end of plate 240 is drilled to take a screw 242 that screwthreads into the aforementioned boss 237. Welded to the lower edge of spring arm 234 is a lug provided with a drill hole through which screw 242 passes, as shown in Figs. 5 and 13. The forward end of spring arm end 238 is drilled with a hole 246 to receive the reduced end 247 of a pin 248 that extends horizontally through yoke arms 37a and 37b, as clearly shown in Fig. 5. This pin 248 is longitudinally slidable in the yoke arms, and when the pin is home the pin shoulder 251 is against spring end 238. The pin is fastened in this position by means of a hook 253 that is inserted in a suitable hole drilled through the reduced pin end, as indicated. The other end of pin 248 is provided with a cross pin 256 which is received within a slot 257 in yoke arm 37a when the pin is home, the pin thus being keyed against removal, and against rotation. The spring end 238 is thus rigidly secured to the vertically pivoted arm-carrying yoke by means of clamping plate 240 and screw 242, acting together with pin 248.

It will now be understood that horizontal swinging of the draw bar acts through the draw bar guide arm and spring arm 234 engaged thereby, to rotate the pivot yoke and thereby cause the connecter arm to follow horizontal swing of the guide arm. This swing, however, is limited in extent to about five degrees on either side of center by the stop plunger 221 and notch 222 in the yoke bearing members; and when the draw bar swings to one side through an angle greater than that allowed the connecter arm, the over movement of the draw bar is taken up by flexure of spring arm 234. It may here be noted that although the spring arm 234 is not mounted on that part of the connecter arm that pivots on a horizontal axis between the arms of the yoke, but rather is mounted directly on the yoke so that the guide connection is not broken by vertical swinging of the connecter arm, the spring arm may nevertheless be considered, as regards horizontal swinging of the arm about the vertical pivot mounting of the yoke, as being mounted on the connecter arm, and in some of the claims the spring arm is broadly so mentioned. In this aspect the horizontal axis connecter arm pivot is merely a pivot joint in the vertically pivoted connecter arm.

In the case of passenger equipment, where the draw bar arm may be centered by springs, as indicated at 26 in Fig. 1, it will be evident that the draw bar guide connection between the draw bar and pipe connecter arms results in the centering springs 26 centering the pipe connecter arm also. It will accordingly be evident that the resilient draw bar guide connection in this case acts as a spring centering device for the pipe connecter arm, as well as a guide for causing the pipe connecter arm to follow the draw bar in horizontal swinging.

When it is desired to rotate the connecter arm on its vertical pivot mounting to its inoperative position transversely of the car length, the hook 253 is removed from the end 247 of pin 248 and the pin pulled from the other end out of engagement with end 238 of spring 234. The screw 242 that passes through the spring arm lug 243 is then loosened, which permits the spring arm to pivot thereon. The yoke part 239 that projects out over the spring arm is cut with an angular notch 260 (see Fig. 13) that permits the spring arm then to be tilted downwardly to the angle indicated, which lowers the forward end of the spring arm out of the groove 233 of the draw bar guide part 232. The spring arm then clears the draw bar guide, and by pulling the stop plunger handle 224, the connecter arm and spring arm are freed to swing horizontally to the inoperative transverse position mentioned.

The operation of the draw bar guide for the pipe connecter arm will now be considered in more detail. If the two cars to be coupled are on a straight track, and the draw bars are not thrown widely to one side, the draft and pipe couplings will both easily make. If, however, the draft couplers are thrown to opposite sides, the draft coupling may not make. Now due to the draw bar guides, the pipe connecter arms will also have been thrown horizontally in opposite directions, but they cannot have been thrown through more than a given angle, in the present instance five degrees, due to the limitation on the arc of horizontal swing imposed by the previously described stops, the balance of the movement of the draw bar guide arms being taken up by flexure of spring arms 234. And the amount of misalinement thus given the connecter arms is not sufficient to carry their heads outside of their gathering range, and they therefore couple even though the draft coupling does not. Thus on straight tracks the pipe connecters never fail to couple, even when the draw bars are moved to positions of extreme misalinement from which coupling is impossible.

On curved tracks, coupling of both the draft and pipe couplers is more difficult. There are a number of curved and angular track conditions encountered in coupling cars, including simple and compound curves in one direction, reverse or S curves, offset conditions at branching tracks, etc., all of which require consideration. On ordinary track runs the tracks are not of a curvature exceeding eight or ten degrees at the most, but on side tracks and switchings the curvature may run up to from thirty to forty degrees, and in the latter case coupling of both the draft couplers and pipe connecters is exceedingly difficult. The draw bar guide of the pipe connecters as provided by the present invention, however, places the pipe connecters in such relative positions whenever a coupling is to be made that the pipe connection is always accomplished if conditions are sufficiently favorable that the draft coupling can be made, and, in fact, brings the pipe connecters to positions from which they can connect in many cases where the draft couplings, even after manual positioning of the draw bars, will fail to make.

A few typical curved track situations will here be mentioned. In the case of a pair of cars to be coupled on a simple curve, and with the draw bar and pipe connecter arms at normal center position, extending at right angles from their respective car ends, the arms will extend towards each other at the same angle as do their respective cars, and the greater the track curvature, the greater, of course, is the angularity. Now if this angularity is not excessive, both the draft and pipe couplings may make without difficulty, as on a straight track. As the angularity increases, however, it becomes increasingly difficult to make the coupling; and to facilitate the coupling in such situations the draw bar arms commonly are manually thrown over both in the same direction to a position of as near alinement as can be achieved. This frequently permits making of the draft coupling. And by virtue of the draw bar guide of the present invention, this operation also causes a corresponding limited swing over of the pipe connecter arms, and thereby facilitates their connection. It will be remembered that the pipe connecter arms are capable of a five degree swing on either side of center, and that the pipe connecter heads are capable of a further twenty seven and one-half degree swing on their knuckle mountings, giving a total angular connecter head swing of thirty two and one-half degrees. On tracks of sharp curvature, both of these swings are involved in the coupling, the arms first being swung over by the draw bar guides, and the heads subsequently swinging through the additional angle required as they interengage. This total possible swing of the pipe connecter heads is more than sufficient to care for the sharpest curve on which the draft couplings can be coupled, and on simple or uni-directional curves the pipe connecters accordingly always couple if the draft coupling can be made.

On S or reverse curves the situation is frequently even more difficult, as in that case there is an offset condition to be contended with, frequently together with an angular condition. This offset condition is also encountered at the branches of sidings. When the draw bar arms are thus offset and in center position with respect to their car ends the draft couplings will not make, although the pipe connecters frequently will connect. If the offset is not too great, the draft coupling can be made by throwing one draw bar over in one direction, and the other draw bar in the other, until the heads will mate properly. And due to the draw bar guides, this of course also corrects the misalinement of the pipe connecters, and positively assures their connection.

Assume now an offset condition with the cars each offset to the left (looking at the respective car ends) or towards the knuckle side of its own draft coupler head, and assume that the draw bars are thrown their limit apart, each being thrown fully over its knuckle side. Now in this extreme case, if the offset of the cars is sufficiently great, the pipe connecter head tongues (which are on the pipe connecter head side opposite the draft coupler knuckle side, as indicated in Fig. 3) may miss entirely and the connecter heads will pass. In such a case the offset may be sufficiently great that the draw bar heads also miss entirely and pass each other, in which case they may not be stopped until they reach the striker plates or end sills of the car. In such a case, however, no damage to the pipe connecters ensues, as will be mentioned again hereinafter.

In the opposite case, where the offset is in the opposite direction, and each draw bar is thrown entirely over to its guard side, that is to the right, the draft couplings may again clear and pass each other, and if the offset is sufficiently great the pipe connecters will not connect. In this case, however, the tongues of the pipe connecter heads are simply outside the guide mouths of the opposing heads, and the pipe connecter heads do not clear each other, but rather the plates forming the guide mouths come together. The result in this case is simply that the pipe connecter heads do not connect, but retract as the cars come together, the telescoping tubes simply contracting until the cars are stopped, and no damage whatever is done to the connecters. The illustrations given in this and the preceding paragraph, however, are extreme cases, depending upon the draw bars being thrown widely apart. In all proper or usual cases the draw bars will be thrown towards one another to facilitate the coupling, and the operation of the draw bar guides will in all of such cases cause the pipe connection to be made, even in many cases where the draft coupling can not be made.

Thus under all adverse conditions wherein it becomes necessary to aline the draw bar to make possible coupling of the draft coupler, the draw bar guides assure that the pipe connecter arms will also be alined sufficiently to make the connection, and in fact frequently bring the pipe connecter arms into sufficiently good alinement to couple even when the misalinement of the cars is so great that the draft couplings cannot couple. It will be evident, therefore, that the draw bar guides afford assurance in all cases where coupling is difficult because of horizontal misalinement or angularity of connecter arms, that the pipe connection will positively be made if the draft coupling can be made, and that no attention is required by the brakemen even in the most extreme cases beyond the customary alinement of the draw bars.

As has been said, it is frequently the case that the misalinement is sufficiently great to cause the draft couplings to miss and pass each other—even as far as the end sills of opposite cars, and when this is the case it most frequently occurs that the pipe connecters couple despite this fact. In this case, each of the pipe connecter arms simply contracts with the shock, the plunger tube telescoping within the cylinder tube against the internal spring 112, until the passed draft coupler heads are finally stopped by coming against the striker plates or end sills on the opposing cars. In the rare cases wherein the pipe connecter heads miss also, no damage is done, and when the cars are pulled apart, the passed connecter heads pull back past each other without difficulty.

For the purpose of disclosing the draw bar guide of the present invention, a preferred car-supported pipe connecter having characteristics to which my invention applies has been set forth in detail, that connecter per se being claimed in my companion case entitled "Automatic train pipe connecter," filed May 9, 1932, Ser. No. 610,280. It is to be understood, however, that in its broader aspects, the present invention is not to be limited to any particular pipe connecter construction aside from one mounted on the car body for horizontal swinging movement. Moreover the preferred specific embodiment herewith disclosed is shown merely for illustrative purposes, and it is to be understood that various changes in design, construction and arrangement therein may be made without departing from the spirit and scope of the appended claims.

I claim:

1. In combination with a vehicle having a draw bar coupler arm mounted thereon for horizontal swinging movement: a pipe coupler arm below the draw bar arm, a vertical pivot mounting for the pipe coupler arm on the vehicle body, stop means limiting the swing of said pipe coupler arm about said vertical pivot mounting to a given angle on either side of center position, and a guide arm depending from the draw bar arm and having a yielding interconnection with the pipe connecter arm to yieldingly urge it to pivot on said vertical pivot mounting to follow the draw bar between the limits of said stops, said interconnection yielding to permit the draw bar to have a larger angle of horizontal swing movement than that to which the pipe coupler arm is limited.

2. In combination with a vehicle having a draw bar coupler arm mounted thereon for horizontal swinging movement: a pipe coupler arm below the draw bar arm, a vertical pivot mounting for the pipe coupler arm on the vehicle body, stop means limiting the swing of said pipe coupler arm about said vertical pivot mounting to a given angle on either side of center position, a guide arm depending from the draw bar arm, and a resilient interconnection between said guide arm and the pipe coupler arm urging said pipe coupler to pivot on said vertical pivot mounting to follow horizontal swinging of the draw bar arm within the limits allowed by said stop means, and yielding to permit the draw bar to have a larger angle of horizontal swinging movement than that to which the pipe coupler arm is limited.

3. In combination with a vehicle having a draw bar coupler arm mounted thereon for horizontal swinging movement: a pipe coupler arm below the draw bar arm, a vertical pivot mounting for the pipe coupler arm on the vehicle, a flat horizontally extending spring member connected at one end with said pipe coupler arm near said vertical pivot mounting and projecting forwardly therefrom, said spring arranged to flex horizontally, and a guide arm depending from said draw bar and engaging the free end of said spring member.

4. In combination with a vehicle having a draw bar coupler arm mounted thereon for horizontal swinging movement: a pipe coupler arm below the draw bar arm, a vertical pivot mounting for the pipe coupler arm on the vehicle, a flat spring member mounted at one end on said pipe coupler arm at the vertical pivot mounting of said arm and arranged to flex horizontally, and a guide arm depending from said draw bar and engaging the free end of said spring member.

5. In combination with a vehicle having a draw bar coupler arm mounted thereon for horizontal swinging movement: a supporting member mounted on said vehicle for rotation about a vertical axis, a pipe coupler arm mounted on said supporting member, a spring member mounted on said supporting member and extending forwardly therefrom, said spring member arranged to yield horizontally, and a depending guide arm on said draw bar arm engaging said spring member, said spring member and guide arm being so constructed and arranged as to urge the pipe coupler arm to follow the horizontal movements of the draw bar arm.

6. In combination with a vehicle having a draw bar coupler arm mounted thereon for horizontal swinging movement: a supporting member mounted on said vehicle for rotation about a vertical axis, a pipe connecter arm mounted on said supporting member, a spring member mounted at one end on said supporting member and extending forwardly parallel to said connecter arm, and a depending guide arm on said draw bar arm engaging the free forward end of said spring member, said spring member and guide arm being so constructed and arranged as to urge the pipe connecter arm to follow the horizontal movements of the draw bar arm.

7. In combination with a vehicle having a draw bar coupler arm mounted thereon for horizontal swinging movement: a supporting member mounted on said vehicle for rotation about a vertical axis, a pipe coupler arm mounted on said supporting member, a spring member mounted at one end on said supporting member and extending forwardly parallel to said connecter arm, and a depending guide arm on said draw bar arm having a guide slot adapted to receive the free forwardly projecting end of said spring member, said spring member and guide arm being so constructed and arranged as to urge the pipe coupler arm to follow the horizontal movements of the draw bar arm.

8. In combination with a vehicle having a draw bar coupler arm mounted thereon for horizontal swinging movement: a pipe coupler arm below the draw bar arm, a vertical pivot mounting for the pipe coupler arm on the vehicle, a flat spring member connected at one end with said pipe coupler arm and extending forwardly from said connection parallel to said arm, said spring member being arranged to flex horizontally, and a depending guide arm on said draw bar arm having a guide slot adapted to receive the free forwardly projecting end of said spring member.

9. In combination with a vehicle having a draw bar coupler arm mounted thereon for horizontal swinging movement: a pipe coupler arm below the draw bar arm universally mounted on and supported from the vehicle independently of the draw bar arm, a depending guide arm on said draw bar arm having its lower end bifurcated, and a member adapted to be received upwardly between the bifurcations of said guide arm and associated with the pipe coupler arm to swing said arm horizontally with horizontal swinging movement of the guide arm.

10. In combination with a vehicle having a draw bar coupler arm mounted thereon for horizontal swinging movement: a supporting member mounted on said vehicle for rotation about a vertical axis, a pipe coupler arm mounted on said supporting member, a depending guide arm on said draw bar arm having its lower end bifurcated, and a member mounted on said supporting member and projecting forwardly between the bifurcations of said guide arm, so that horizontal swinging of the draw bar arm acts through the guide arm and forwardly projecting member to cause corresponding horizontal swing of the pipe coupler arm.

11. In combination with a vehicle a draw bar coupler arm mounted thereon for horizontal swinging movement: a supporting member mounted on said vehicle for rotation about a vertical axis, a pipe coupler arm mounted on said supporting member, a flat spring member mounted on said supporting member and projecting forwardly therefrom, and a depending guide arm on said draw bar arm having a bifurcated lower end straddling the forward end of said flat spring member.

12. In combination with a vehicle having a draw bar coupler arm mounted thereon for horizontal swinging movement: a supporting member mounted on said vehicle for rotation about a vertical axis, a pipe coupler arm mounted on said supporting member, a flat spring member mounted on the supporting member to pivot vertically thereon, means on the supporting member releasably engaging said spring member to hold it against pivotal movement in a position projecting forwardly from said supporting member, and a guide arm depending from the draw bar arm and having a lower bifurcated end adapted to receive the forwardly projecting end of said spring member.

13. In combination with a vehicle having a draw bar coupler arm mounted thereon for horizontal swinging movement: a pipe coupler device embodying an arm below the draw bar arm universally mounted on and supported from the vehicle independently of the draw bar arm, a depending guide arm on said draw bar arm, having a bifurcated lower end, and a member mounted on the pipe coupler arm and projecting between the bifurcations of said guide arm to be engaged thereby during horizontal swinging of the draw bar arm.

14. In combination with a vehicle having a draw bar mounted thereon for horizontal swinging movement: a pipe coupler arm below the draw bar universally mounted on and supported from the vehicle independently of the draw bar, and guide means connected between the draw bar and the pipe coupler arm and acting to move and guide said arm in a horizontal plane only in a manner to follow horizontal swinging of the draw bar.

15. In combination with a vehicle having a draw bar mounted thereon for horizontal swinging movement: a pipe coupler arm below the draw bar universally mounted on and supported from the vehicle independently of the draw bar, and guide means embodying a yielding element connected between the draw bar and the pipe coupler arm and acting to move and guide said arm in a horizontal plane only in a manner to follow horizontal swinging of the draw bar.

16. In combination with a vehicle having a draw bar mounted thereon for horizontal swinging movement: a pipe coupler arm below the draw bar universally mounted on and supported from the vehicle independently of the draw bar, a rigid guide arm depending from the draw bar, and a yielding member operatively associated with the pipe coupler arm and engaged by said depending guide arm in a manner to receive horizontal guiding movement only from said guide arm, whereby the pipe coupler arm is guided to follow horizontal swinging of the draw bar.

17. In combination with a vehicle having a draw bar mounted thereon for horizontal swinging movement: a pipe coupler arm below the draw bar universally mounted on and supported from the vehicle independently of the draw bar, stop means limiting horizontal swing of the pipe coupler arm to a given angle on either side of center position, and guide means embodying a yielding element connected between the draw bar and the pipe coupler arm to yieldingly urge the pipe coupler arm to follow horizontal swinging of the draw bar between the limits of said stops, said yielding element yielding to permit the draw bar to have a larger angle of horizontal swinging movement than that to which the pipe coupler arm is limited.

18. In combination with a vehicle having a draw bar mounted thereon for horizontal swinging movement: a pipe coupler arm below the draw bar universally mounted on and supported from the vehicle independently of the draw bar, a spring member mounted at one end on said pipe coupler arm near the universal mounting of said arm, said spring member extending forwardly from said mounting and being arranged to flex horizontally, and a guide arm depending from said draw bar and engaging the free end of said spring member, said spring member and guide arm being so constructed and arranged as to urge the pipe coupler arm to follow the horizontal movements of the draw bar.

19. In combination with a vehicle having a draw bar mounted thereon for horizontal swinging movement: a pipe coupler arm below the draw bar universally mounted on and supported from the vehicle independently of the draw bar, a flat spring member mounted at one end on said pipe coupler arm near the universal mounting of said arm and projecting forwardly from said mounting, and a guide arm depending from said draw bar and engaging the free end of said spring member.

20. In combination with a vehicle having a draw bar mounted thereon for horizontal swinging movement: a pipe coupler arm below the draw bar universally mounted on and supported from the vehicle independently of the draw bar, and guide means connected between the draw bar and the pipe coupler arm and acting to move and guide said arm in a horizontal plane only in a manner to follow horizontal swinging of the draw bar, said guide means including a disconnectible element whereby the coupler arm may be freed for horizontal movement independently of the draw bar.

21. In combination with a vehicle having a draw bar coupler arm mounted thereon for horizontal swinging movement: a pipe coupler arm below the draw bar arm, a vertical pivot mounting for the pipe coupler arm on the vehicle, a spring arm connected at one end with said pipe coupler arm and extending forwardly from said connection, and a depending guide arm on said draw bar arm having a guide slot adapted to receive the free forwardly projecting end of said spring member, said spring member and slotted guide arm being arranged for disconnection from each other whereby the pipe coupler arm may be freed for horizontal movement independently of the draw bar.

ALBERT S. JOHNSON.